(12) United States Patent
Kanasugi et al.

(10) Patent No.: US 10,703,666 B2
(45) Date of Patent: Jul. 7, 2020

(54) 3D COVER GLASS, MOLD FOR MOLDING SAME, AND METHOD FOR MANUFACTURING 3D COVER GLASS

(71) Applicant: AGC Inc., Chiyoda-ku (JP)

(72) Inventors: Satoshi Kanasugi, Tokyo (JP); Takanori Fukushi, Tokyo (JP); Shunji Wachi, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 83 days.

(21) Appl. No.: 16/123,112

(22) Filed: Sep. 6, 2018

(65) Prior Publication Data
US 2019/0071343 A1    Mar. 7, 2019

(30) Foreign Application Priority Data

Sep. 6, 2017  (JP) .................. 2017-171117
Jun. 13, 2018 (JP) .................. 2018-112703

(51) Int. Cl.
*C03B 23/03* (2006.01)

(52) U.S. Cl.
CPC ...... *C03B 23/0302* (2013.01); *C03B 23/0307* (2013.01); *C03B 2215/60* (2013.01)

(58) Field of Classification Search
CPC .................. C03B 23/0302; C03B 2215/60
USPC ........................................................ 428/174
See application file for complete search history.

(56) References Cited

U.S. PATENT DOCUMENTS

| 9,512,029 | B2 | 12/2016 | Ehemann et al. | |
|---|---|---|---|---|
| 2009/0022951 | A1* | 1/2009 | Nelissen | G02B 1/02 |
| | | | | 428/141 |
| 2011/0274916 | A1 | 11/2011 | Murata | |
| 2012/0131961 | A1 | 5/2012 | Dannoux et al. | |
| 2014/0331716 | A1* | 11/2014 | Ahmed | G06F 17/10 |
| | | | | 65/30.14 |
| 2014/0377508 | A1* | 12/2014 | Oh | B32B 37/10 |
| | | | | 428/174 |
| 2015/0171411 | A1* | 6/2015 | Kobayashi | H01M 2/22 |
| | | | | 429/61 |
| 2016/0031737 | A1* | 2/2016 | Hoppe | C03B 23/0256 |
| | | | | 428/187 |
| 2016/0137550 | A1* | 5/2016 | Murata | C03B 23/03 |
| | | | | 428/141 |
| 2016/0162615 | A1 | 6/2016 | Ahmed et al. | |
| 2017/0121210 | A1 | 5/2017 | Rai et al. | |

(Continued)

FOREIGN PATENT DOCUMENTS

JP    2016-524582    8/2016

OTHER PUBLICATIONS

Jose Zimmer, "Invited Paper: Novel Thin Glass for 3D Shaped Electronics Display Covers," SID Symposium Digest of Technical Paper Session 57.1, 2011, pp. 833-836.

*Primary Examiner* — Tahseen Khan
(74) *Attorney, Agent, or Firm* — Oblon, McClelland, Maier & Neustadt, L.L.P.

(57) ABSTRACT

Provided is a molding die for 3D cover glass containing a pair of a convex mold and a concave mold each having a flat press surface A and a press surface B, in which the closest distance D between the press surfaces A of the convex mold and the concave mold during press-molding and the closest distance D1 between the press surfaces B of the convex mold and the concave mold during press-molding satisfy a predetermined conditions with respect to the plate thickness of a 3D cover glass as a final product.

13 Claims, 11 Drawing Sheets

(56) References Cited

U.S. PATENT DOCUMENTS

2018/0009697 A1\* 1/2018 He .................... C03C 21/005
2019/0071343 A1\* 3/2019 Kanasugi ............ C03B 23/0307
2019/0135677 A1\* 5/2019 Fukushi .............. C03B 23/0302

\* cited by examiner ated in FIG. 1 to an image display device used in the mobile equipment has been studied. FIG. 1 shows one configuration example of a 3D cover glass 100, whose central part 110 is composed of a flat plane and whose peripheral part is configured of a three-dimensional shaped curved part 120.

3D COVER GLASS, MOLD FOR MOLDING SAME, AND METHOD FOR MANUFACTURING 3D COVER GLASS

TECHNICAL FIELD

The present invention relates to a cover glass (3D cover glass) with a three dimensional shape, for an image display device used in a mobile equipment such as a mobile phone, smartphone and tablet device, or used in an automotive display such as a Center Information Display (CID) and cluster. The present invention also relates to a mold for molding such a cover glass, and a method for manufacturing the cover glass.

BACKGROUND

In order to improve the design of a mobile equipment such as a mobile phone, smartphone and tablet device, application of such a 3D cover glass as illustrated in FIG. 1 to an image display device used in the mobile equipment has been studied. FIG. 1 shows one configuration example of a 3D cover glass 100, whose central part 110 is composed of a flat plane and whose peripheral part is configured of a three-dimensional shaped curved part 120.

The cover glass in the image display device needs to be thinned and is also subjected to a chemical strengthening treatment because it requires a certain strength. In the 3D cover glass having a three-dimensional shaped curved surface in the peripheral part thereof, occurrence of warpage due to the chemical strengthening treatment provides a problem. FIG. 2A and FIG. 2B are schematic views illustrating occurrence of warpage in a 3D cover glass due to the chemical strengthening treatment. Specifically, FIG. 2A is a cross-sectional schematic view illustrating a state before execution of the chemical strengthening treatment, and FIG. 2B is a cross-sectional schematic view illustrating a state after execution of the chemical strengthening treatment, that is, a state of occurrence warpage in a 3D cover glass due to the chemical strengthening treatment. In this case, as illustrated in FIG. 2A, for example, before execution of the chemical strengthening treatment, the central part is flat, whereas, as illustrated in FIG. 2B, after execution of the chemical strengthening treatment, convex warpage occurs in the central part.

Patent Document 1 proposes a method for correcting the warpage of the 3D cover glass due to the chemical strengthening treatment.

Patent Document 1: JP-T 2016-524582

SUMMARY

FIG. 3A illustrates a cross-sectional schematic view of a mold for a 3D cover glass formed according to a procedure described in Patent Document 1, in which, in the mold, the warpage illustrated in FIG. 2B is inverted. The mold illustrated in FIG. 3A include a pair of a convex mold 200 and a concave mold 300 and is characterized in that the press surfaces thereof, which correspond to the central part of the 3D cover glass providing a flat plane in the 3D cover glass as a final product, are curved surfaces with low flatness. In press-molding a 3D cover glass by using such a mold having low flatness press surfaces, when, as illustrated in FIG. 3B by the arrow a, the fitting between the pair of molds is misaligned, the centers of the molds are deviated from each other, whereby the plate thickness clearance between the press surfaces of the molds becomes uneven. Here, "plate thickness clearance" means the shortest distance at an arbitrary position between the convex mold surface and concave mold surface facing each other when molding a 3D cover glass by the convex mold and the concave mold.

The uneven plate thickness clearance makes it difficult to control the pressure at portions corresponding to the four corners of the central part 110 which provides a flat plane in the 3D cover glass 100 as the final product, whereby, as illustrated in FIG. 3C, the pressure becomes uneven depending on the portions. Explaining in the example of FIG. 3C, the pressure relatively concentrates on the portion indicated by the arrow b and the pressure does not concentrate on the portion surrounded by the broken line c. Therefore, there is a problem in the 3D cover glass 100 as the final product that wrinkles are generated particularly in the portions thereof corresponding to the four corners of the central part 110 providing a flat plane. Furthermore, there is also a problem that such wrinkles, depending on the stress distribution from the four corners, are generated not only in the four corners of the central part 110 but also in the other portions than the four corners. Here, the wrinkles are linear appearance defects generated when the material locally slacks during molding. The wrinkles can be confirmed by a method of transmitting linear light through a sample to display it on a screen and checking defects with its light and darkness, or can be confirmed by digitizing the phase difference (retardation) due to birefringence of the linear light.

In order to solve the above-described problems, the present invention has an object to provide a molding die for 3D cover glass, capable of suppressing generation of wrinkles in press-molding; a 3D cover glass in which generation of wrinkles in press-molding is suppressed; and a method for manufacturing a 3D cover glass.

In order to attain the above-described object, the present invention provides a molding die for 3D cover glass containing: a flat central part; a peripheral part; and a curved part located at least in a portion of the peripheral part and defining a 3-dimensional curved surface having a curvature radius of 100 mm or less, in which the molding die includes a pair of a convex mold and a concave mold each having a flat press surface A corresponding to the central part and a press surface B corresponding to the curved part, in which the closest distance D [mm] between the press surfaces A of the convex mold and the concave mold during press-molding is t mm or larger and (t+0.02) mm or smaller in which t [mm] represents a plate thickness of a 3D cover glass as a final product, and in which in the convex mold, when a boundary line between the press surface A and the press surface B is defined as a first position where the curvature radius becomes 100 mm or less in a direction from the center of the press surface A toward a periphery; an original point is defined as an arbitrary point on the boundary line; an X axis is defined as a line extending from the original point in parallel to the press surface A and orthogonally to the boundary line; in the X axis, a direction toward the press surface A from the original point is defined as a minus direction and the opposite direction thereof is defined as a plus direction; a Z axis is defined as the normal line direction at the center of the press surface A; and in a cross-sectional view in the XZ plane, the closest distance between the press surfaces B of the convex mold and the concave mold during press-molding at individual locations of the press surface B is represented by D1 [mm], the maximum value of the change amount $\Delta D1/\Delta X$ of D1 in the plus direction of the X axis with the convex mold as a reference is 0.01 or more and the maximum value of D1 is (t+0.10) mm or larger and (t+0.50) mm or smaller.

Also, in the molding die for 3D cover glass, it is preferable that the convex mold and the concave mold are each composed of a material having a thermal conductivity of 50 W/(m·K) or more, and that the convex mold and the concave mold have volumes of V1 [mm$^3$] and V2 [mm$^3$], respectively, and satisfy a ratio V1/V2 being 0.5 or more and 2.0 or less.

Also, in the molding die for 3D cover glass, at least one of the convex mold and the concave mold preferably include, in the back surface of the press surface A, a concave portion satisfying the following conditions (1), (2) and (3):

(1) the concave portion includes the center of the back surface of the press surface A;

(2) when viewed from the Z axis direction, a X' axis direction is defined as the direction of a straight line which passes through the center of the back surface of the press surface A and whose linear distance $d_x$ [mm] between two intersection points with the boundary line is smallest, the concave portion is formed over the whole of the back surface of the press surface A in the X' axis direction; and (3) when viewed from the Z axis direction, when the maximum length of the press surface B in a direction having an intersection point with a line segment connecting the two intersection points on the X' axis and orthogonal thereto is represented by L [mm], the minimum length and the maximum length of the concave portion in a direction orthogonal to the X' axis direction are represented by L' [mm] and L" [mm], respectively, L, L' and L" satisfy L>L" and a ratio (L'/L) being 0.5 or more and 0.98 or less.

Also, in the molding die for 3D cover glass, the concave portion preferably satisfies the following condition (4):

(4) the concave portion includes an end portion in a direction orthogonal to the X' axis direction being a linear shape parallel to the X' axis direction or being line-symmetrical with respect to the orthogonal direction of the X' axis direction.

Also, in the molding die for 3D cover glass, the concave portion preferably has a depth of 0.1 mm or more and 5 mm or less.

In the molding die for 3D cover glass, the depth of the concave portion is preferably uniform.

The molding die for 3D cover glass preferably includes a ring mold covering the fitted portion between the convex and concave molds.

In the molding die for 3D cover glass, the convex mold preferably has a thermal expansion coefficient at 500° C. being 50×10$^{-7}$/K or more.

In the molding die for 3D cover glass, it is preferable that the convex mold includes a convex part with an outer periphery having a polygonal shape when viewed from the Z axis direction, and the concave mold includes a concave part with an outer periphery corresponding to the polygonal shape when viewed from the Z axis direction, the polygonal shape includes a corner part having a rounded part and connecting together two linear parts when viewed from the Z axis direction, and when a Y axis is defined as an axis orthogonal to the X axis and the Z axis, in a cross-sectional view in the XY plane, the closest distance between the press surfaces B of the convex mold and the concave mold during press-molding is defined in each of the individual locations of the press surface B, and at least a portion of the corner part of the polygonal shape has the closest distance $G_c$ longer than the closest distance $G_s$ in the linear portion of the polygonal shape.

In the molding die for 3D cover glass, the convex mold preferably has a portion configured such that, in the cross-sectional view in the XZ plane, the shape of the press surface B inclines toward the press surface A in the X axis direction as the distance from the press surface A in the Z axis direction.

Also, the present invention provides a method for manufacturing a 3D cover glass including placing a flat glass sheet between the convex and concave molds of the molding die for 3D cover glass of the present invention, heating the glass sheet to mold into a 3D cover glass, and cooling the 3D cover glass.

In the method for manufacturing a 3D cover glass, it is preferable that the glass sheet has a thermal expansion coefficient at 500° C. being larger than that of the convex mold, and a difference between them is 20×10$^{-7}$/K or less.

In the method for manufacturing a 3D cover glass, the 3D cover glass after cooled has the maximum value of a bending angle of preferably 60° or larger and 90° or smaller.

Also, the present invention provides a 3D cover glass having a polygonal shape in a plan view which corner part may have a rounded portion, and including a central part being flat plane and curved parts each with a three-dimensional curved surface having a curvature radius of 100 mm or less on peripheries of at least two of the sides of the polygonal shape, in which the 3D cover glass shows the maximum value of retardation per 1 mm thickness being 16 nm/mm or less when measured by irradiating a light having a wavelength of 543 nm onto the central part orthogonally.

In the 3D cover glass, the polygonal shape is preferably a rectangle.

In the 3D cover glass, it is preferable that when a boundary line between the central part and the curved part is defined as a first position where the curvature radius becomes 100 mm or less in a direction from the center of the central part or the gravity point of the central part toward a periphery; an original point is defined as an arbitrary point on the boundary line; and an X axis is defined as a line extending from the original point in parallel to the central part and orthogonally to the boundary line, the curved part has a length in the X axis direction being preferably 0.5 mm or longer and 50 mm or shorter.

In the 3D cover glass, the curved part preferably has a bending depth of 0.5 mm or more and 30 mm or less.

The 3D cover glass preferably has a plate thickness of 0.3 mm or more and 2.0 mm or less.

The 3D cover glass preferably has the maximum value of a bending angle of 60° or larger and 90° or smaller.

The 3D cover glass preferably has a diagonal size in a plan view being 50 mm or larger and 1,000 mm or smaller.

The 3D cover glass is preferably chemically strengthened.

According to the molding die for 3D cover glass of the present invention, during press-molding, remarkable wrinkles occurring in the central part of the 3D cover glass can be suppressed.

BRIEF DESCRIPTION OF DRAWINGS

FIG. 2A illustrates a state of the 3D cover glass before execution of the chemical strengthening treatment, and FIG. 2B illustrates a state thereof after execution of the chemical strengthening treatment.

FIG. 7A is a perspective view of the press surface of the convex mold, and FIG. 7B is a plan view of the press surface of the convex mold.

Figure 8:
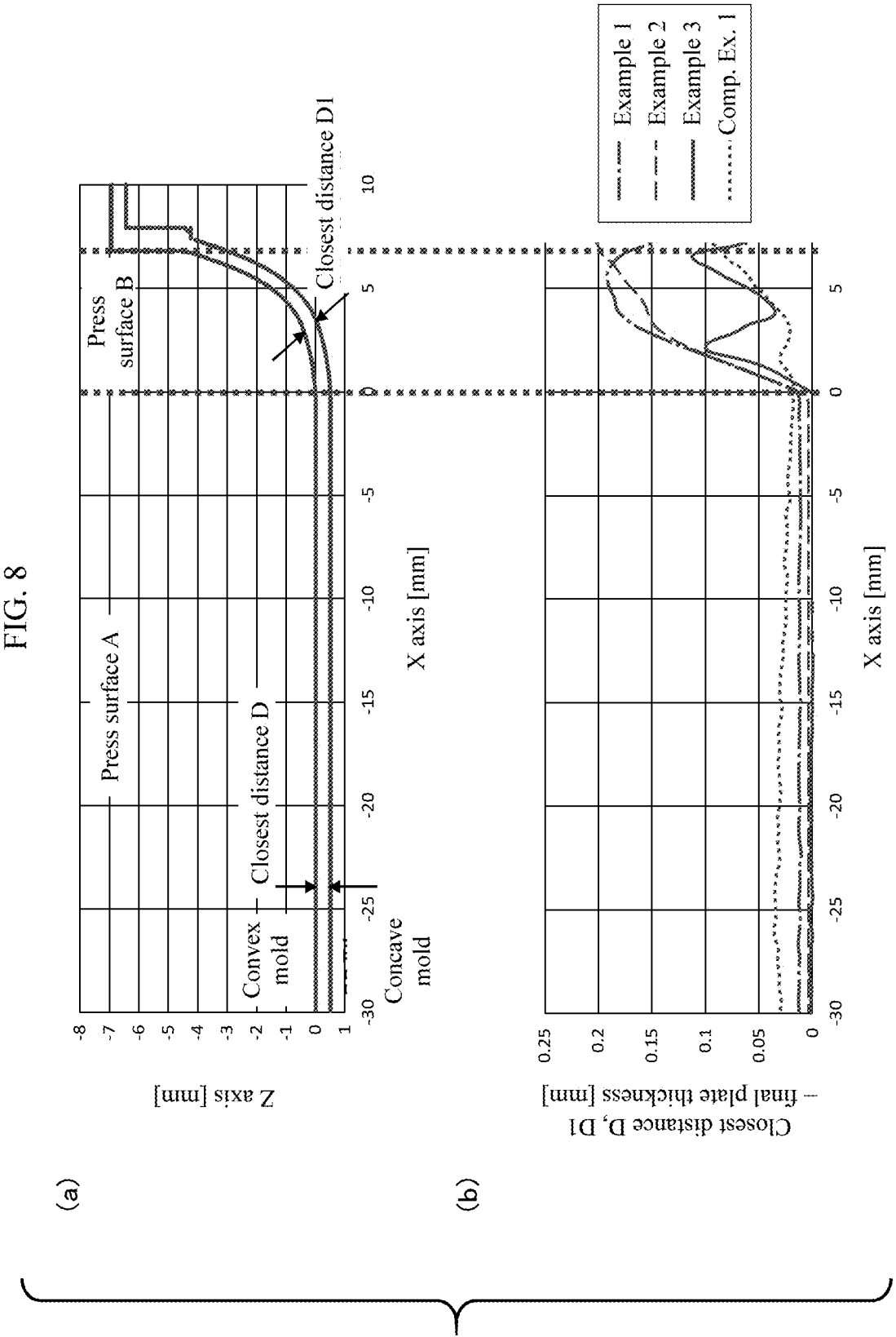

(a) of FIG. 8 is a partial cross-sectional view for explaining the positional relationships at the respective portions of the molding die for 3D cover glass according to the embodiment of the present invention in the fitted state thereof (b) of FIG. 8 is a partial cross-sectional view showing the positional relationships at the respective portions of the molding die for 3D cover glass according to Examples and Comparative example.

Figure 9A:
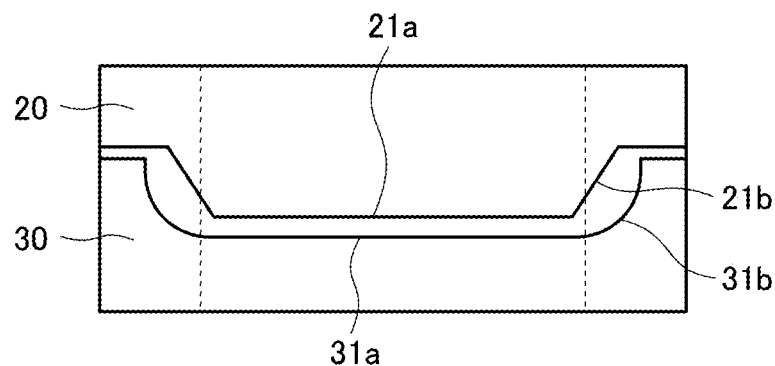
Figure 9B:
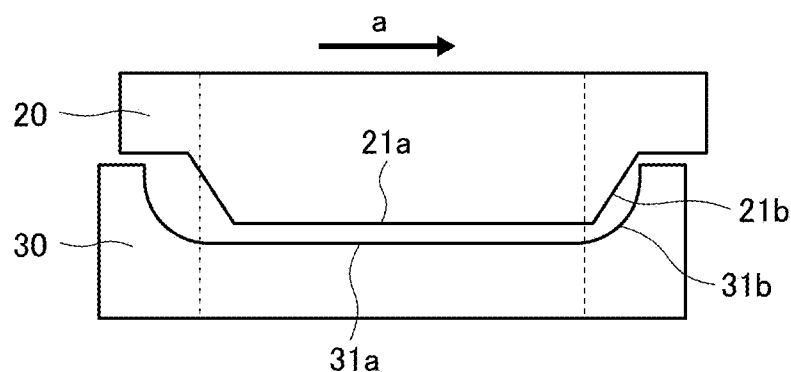
Figure 9C:
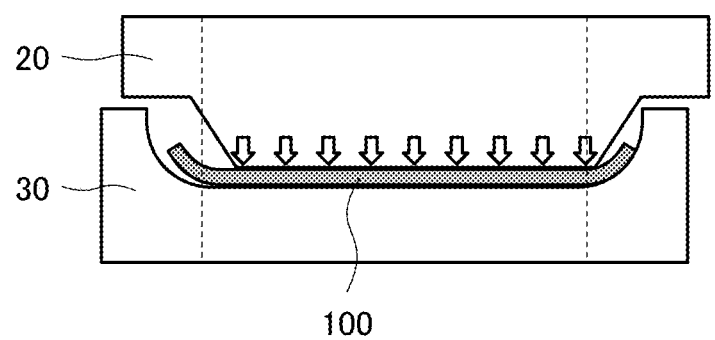

FIG. 9A, FIG. 9B and FIG. 9C are views for explaining a press-molding using the molding die for 3D cover glass according to the embodiment of the present invention.

Figure 10:
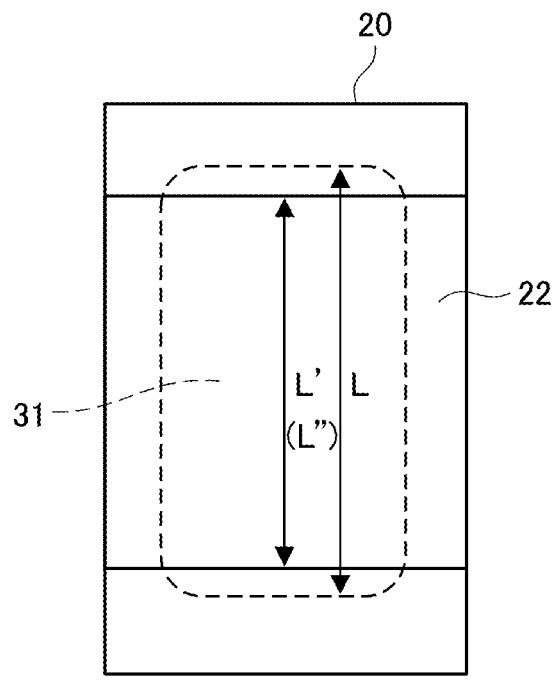

FIG. 10 is a plan view illustrating a configuration example of the molding die for 3D cover glass according to the embodiment of the present invention.

Figure 11:
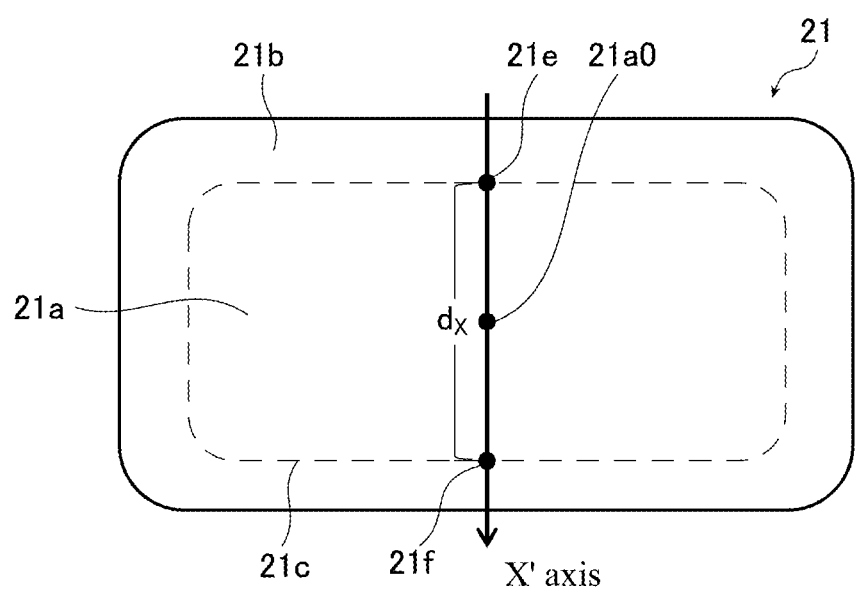

FIG. 11 is a plan view for explaining the positional relationships between the respective portions of the press surface of the convex mold.

Figure 12:
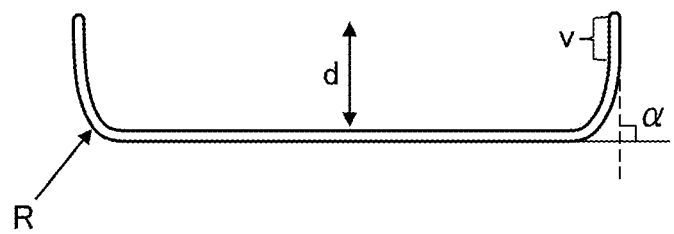

FIG. 12 is a cross-sectional schematic view of the 3D cover glass according to the embodiment of the present invention.

Figure 4:
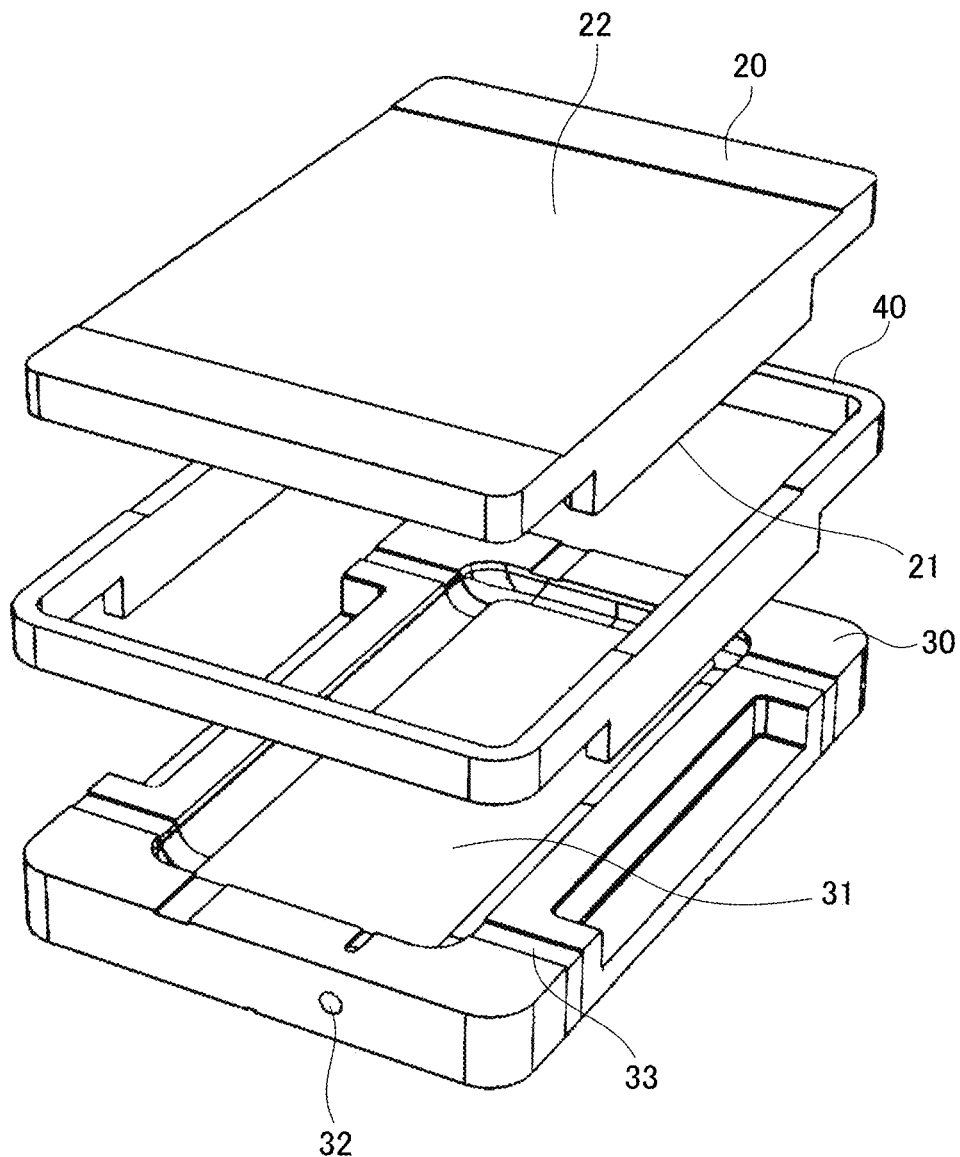
FIG. 4 is a perspective view illustrating a configuration example of a molding die for 3D cover glass according to an embodiment of the present invention.
Figure 13:
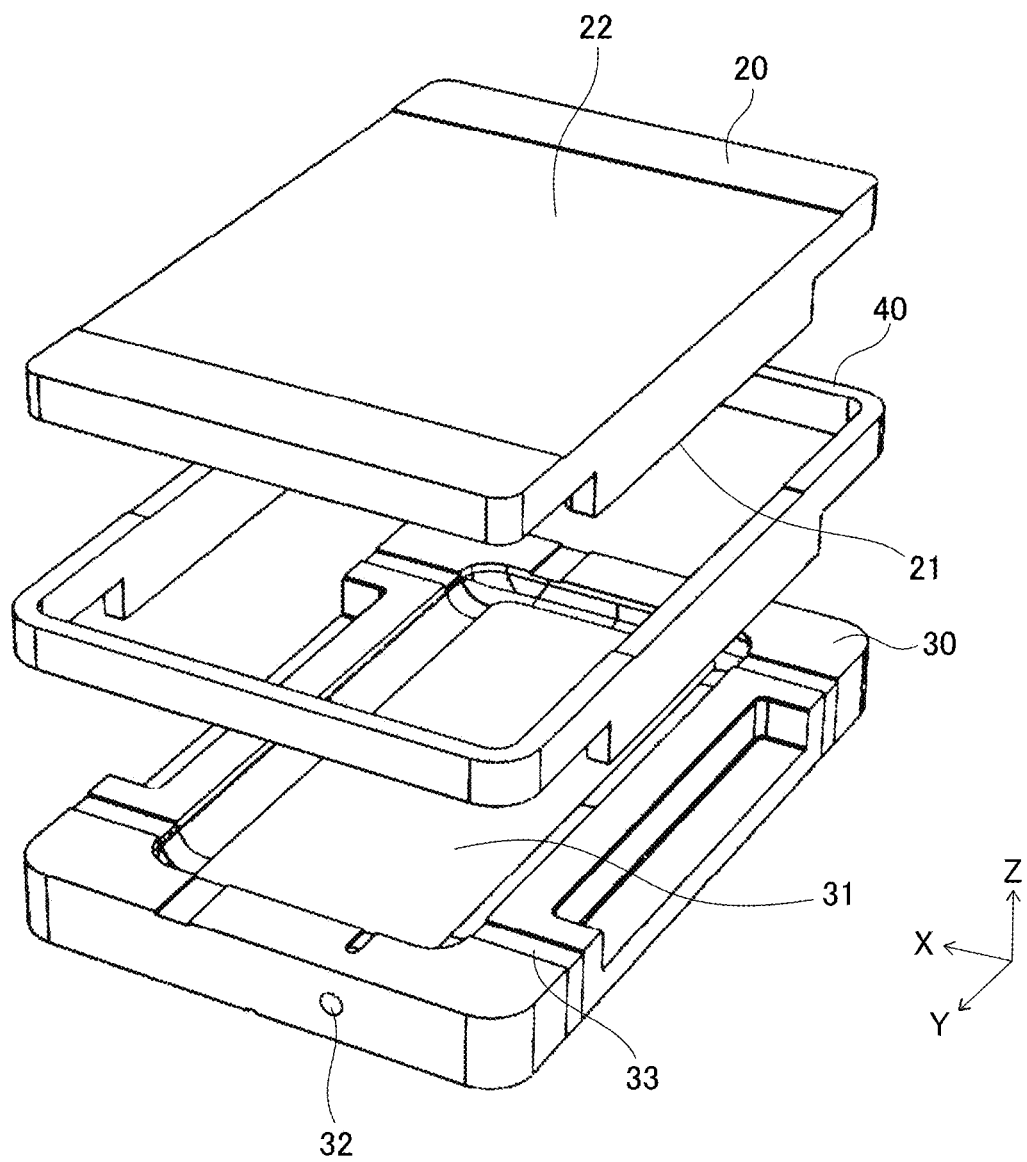

FIG. 13 is a view in which X-Y-Z axes are added to FIG. 4.

Figure 14:
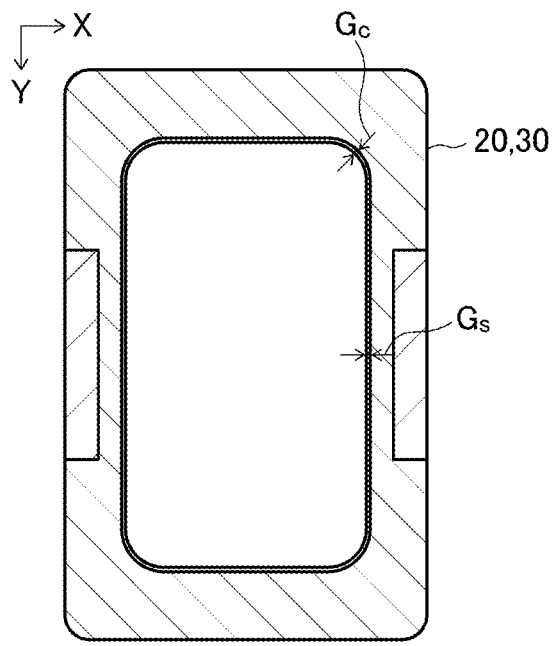

FIG. 14 is a cross-sectional view illustrating a configuration example of the molding die for 3D cover glass according to the embodiment of the present invention.

Figure 15A:
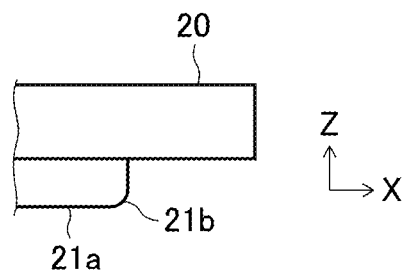
Figure 15B:
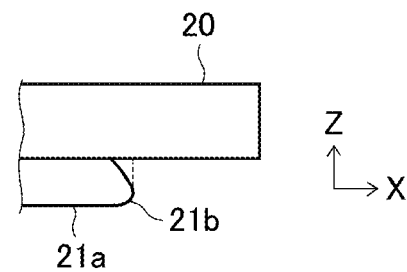

FIG. 15A and FIG. 15B are partial cross-sectional views illustrating configuration examples of a convex mold according to the embodiment of the present invention.

Figure 16:
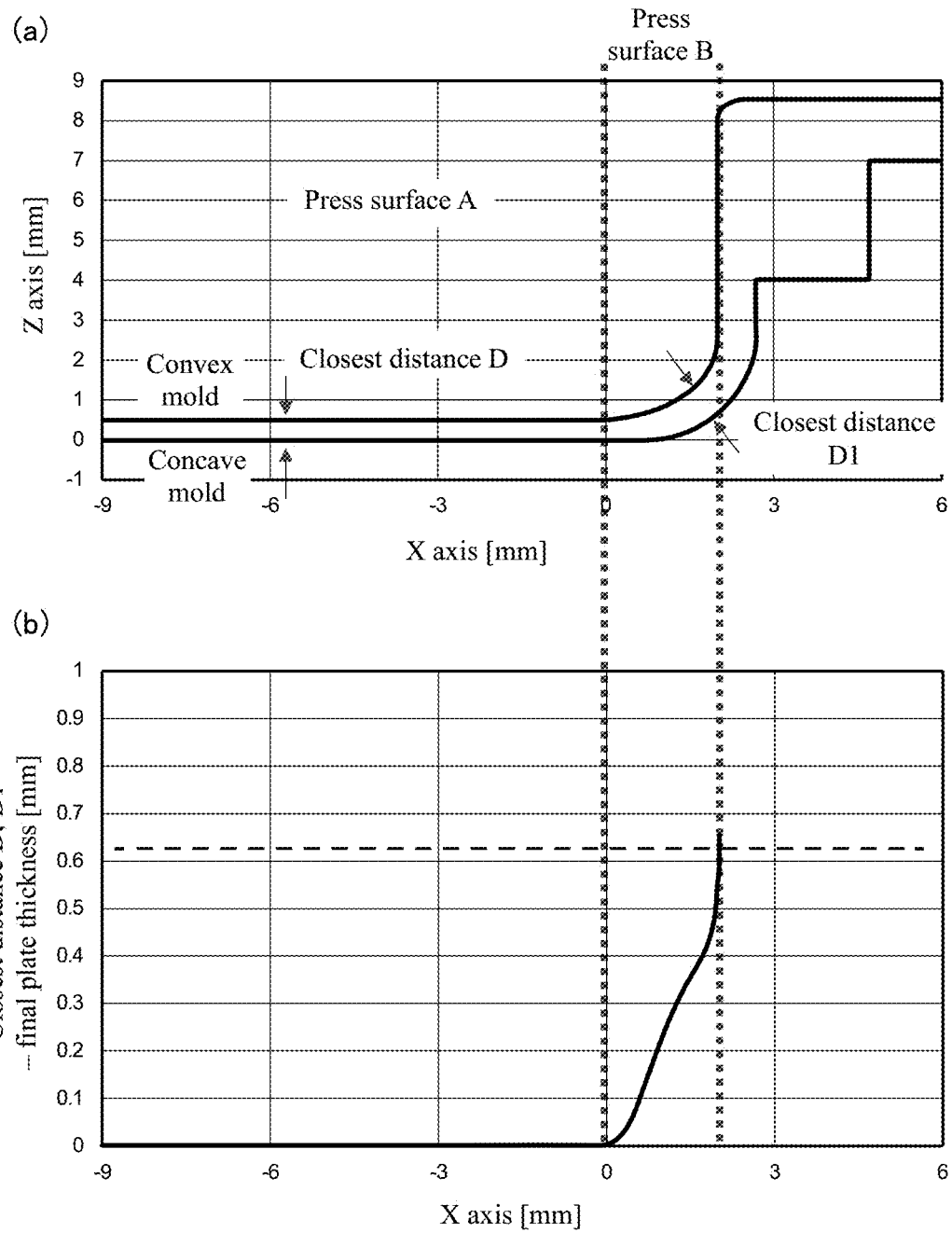

(a) of FIG. 16 is a partial cross-sectional view for explaining the positional relationships at the respective portions of the molding die for 3D cover glass according to the embodiment of the present invention in the fitted state thereof (b) of FIG. 16 is a partial cross-sectional view showing the positional relationships at the respective portions of the molding die for 3D cover glass according to Example 4.

EMBODIMENTS

Description is given below of the present invention with reference to the drawings.

Figure 1:
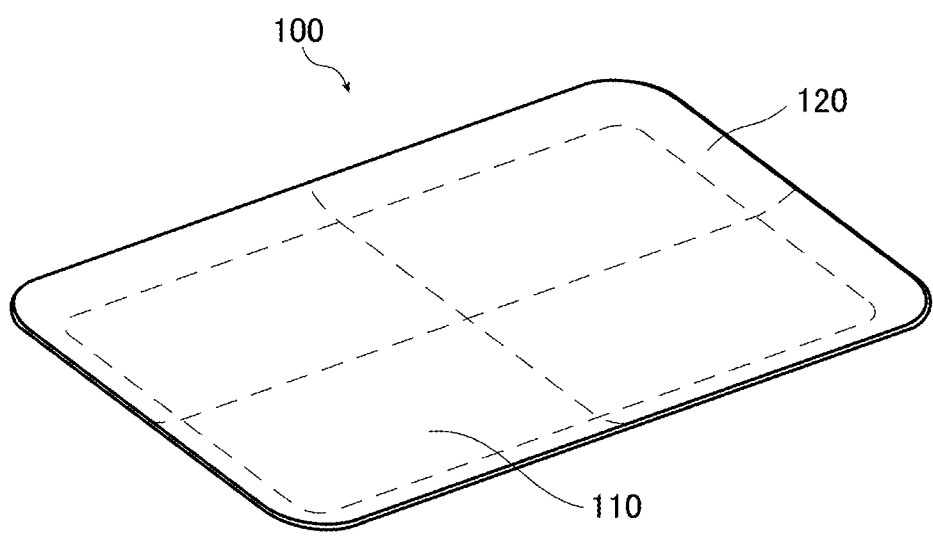
FIG. 1 is a view illustrating a configuration example of a 3D cover glass.
Figure 2A:
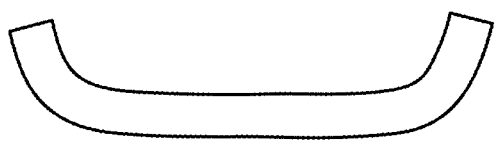
FIG. 2A and FIG. 2B are cross-sectional schematic views of a 3D cover glass, illustrating occurrence of warpage due to a chemical strengthening treatment.
Figure 2B:
Figure 3A:
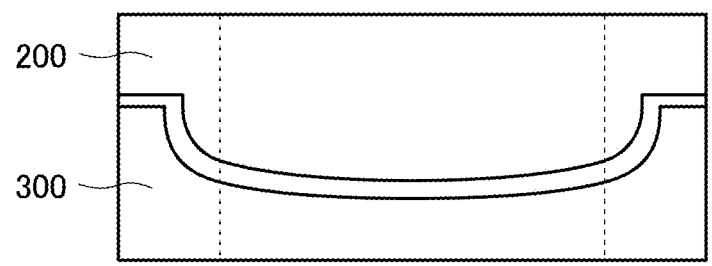
FIG. 3A, FIG. 3B and FIG. 3C are views illustrating a press-molding using a conventional mold in which the warpage illustrated in FIG. 2B is inverted.
Figure 3B:
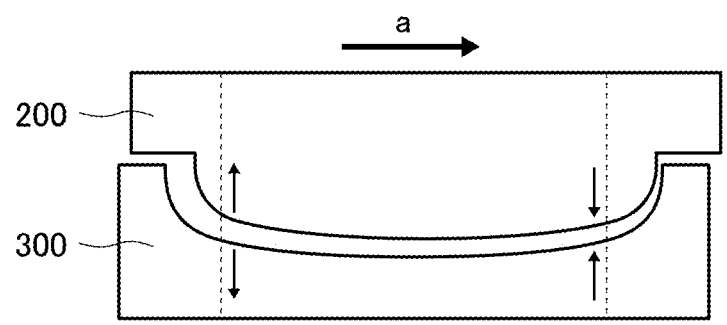
Figure 3C:
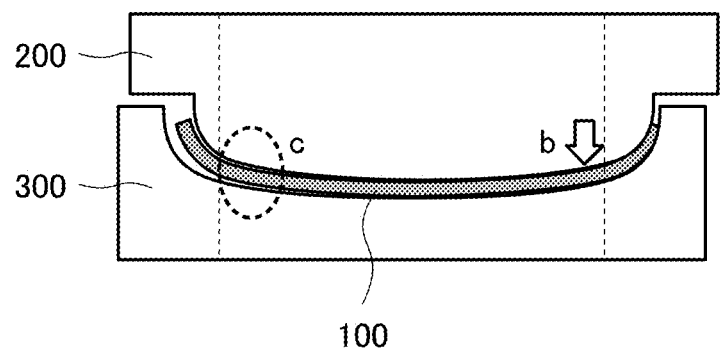

A molding die for 3D cover glass according to an embodiment of the present invention (which is hereafter referred to as "the present molding die for 3D cover glass") is a mold for molding a 3D cover glass such as a 3D cover glass 100 illustrated in FIG. 1 whose central part 110 is formed in a flat-plane and whose peripheral part is formed in a curved part 120 having a 3-dimension curved shape. However, the 3D cover glass to be molded by the present molding die for 3D cover glass is not limited to the cover glass illustrated in FIG. 1, that is, it is not limited to a rectangular 3D cover glass but, as described later, it may be a polygonal 3D cover glass so long as its central part is formed of a flat plane and at least two sides of its peripheral part are formed of curved parts each having a 3-dimensional curved shape with a curvature radius of 100 mm or less. In the 3D cover glass 100 illustrated in FIG. 1, the curved part 120 is provided over the whole periphery of the peripheral part thereof. However, in FIG. 1, of the four sides thereof, for example, only the left and right peripheral parts (sides) may have curved parts, or only the upper and lower peripheral parts (sides) may have curved parts.

Also, the 3D cover glass may have curved parts only in the upper and left peripheral parts (sides), may have curved parts only in the upper and right peripheral parts (sides), may have curved parts only in the lower and left peripheral parts (sides), or may have curved parts only in the lower and right peripheral parts (sides). Furthermore, the 3D cover glass may have curved parts in its three peripheral parts (sides) except for the upper peripheral part, may have curved parts in its three peripheral parts (sides) except for the lower peripheral part, may have curved parts in its three peripheral parts (sides) except for the left peripheral part, or may have curved parts in its three peripheral parts (sides) except for the right peripheral part.

Here, the reason for limiting the curvature radius of the curved part to 100 mm or less is that excellent fit can be provided when touched by hand. While the curvature radius of the curved part depends on the specifications of image display devices, for example, in the case of a smartphone, for increasing the fit thereof, the curved part preferably includes a portion having a curvature radius of 50 mm or less, more preferably includes a portion having a curvature radius of 20 mm or less, and further more preferably includes a portion having a curvature radius of 10 mm or less. Also, for the reason of preventing cracking due to stress concentration at the time of falling, the curvature radius of the curved part is preferably 0.2 mm or more, more preferably 0.5 mm or more, and further more preferably 1.0 mm or more.

Figure 5:
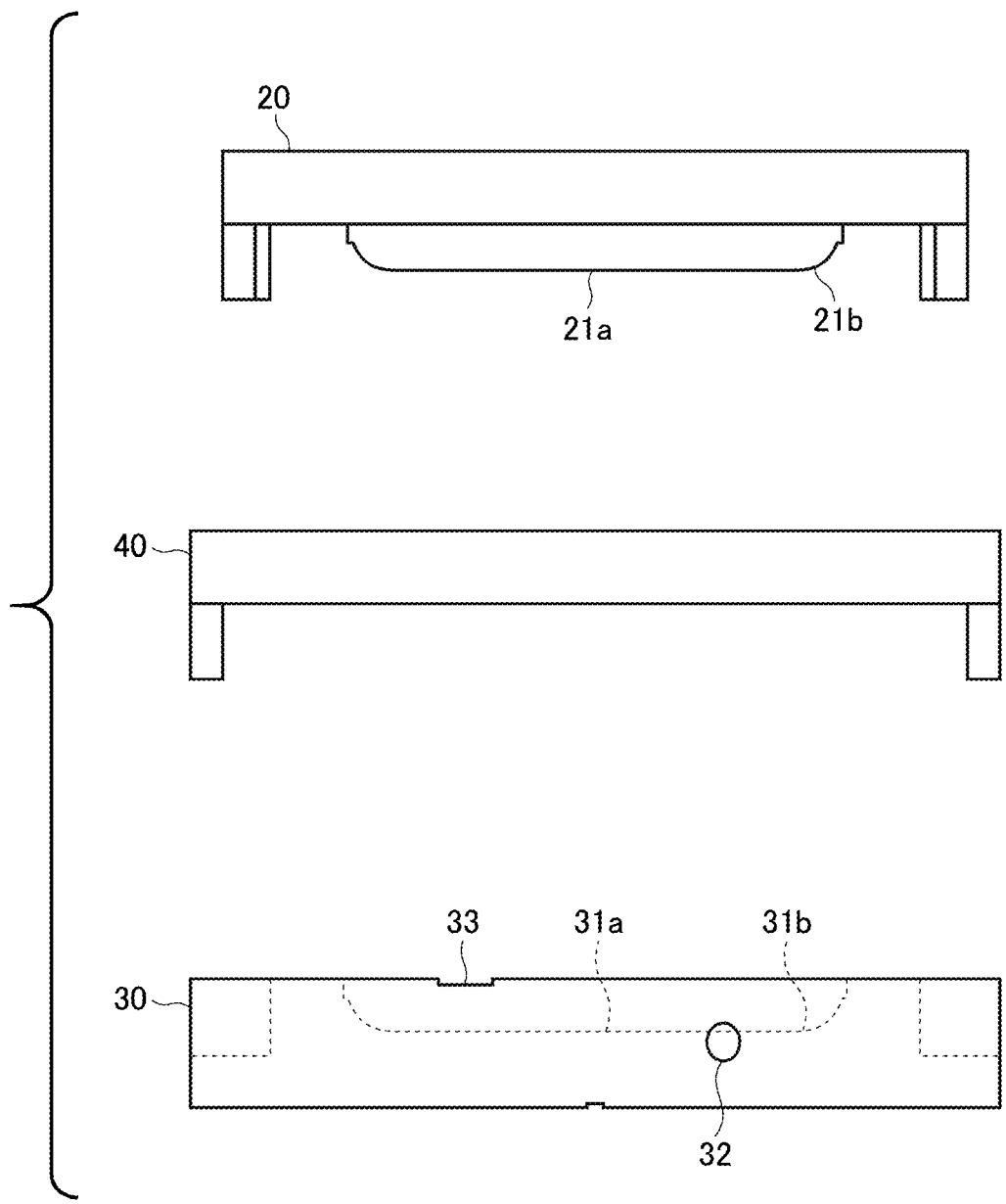
FIG. 5 is a side view of the molding die for 3D cover glass illustrated in FIG. 4.
Figure 6:
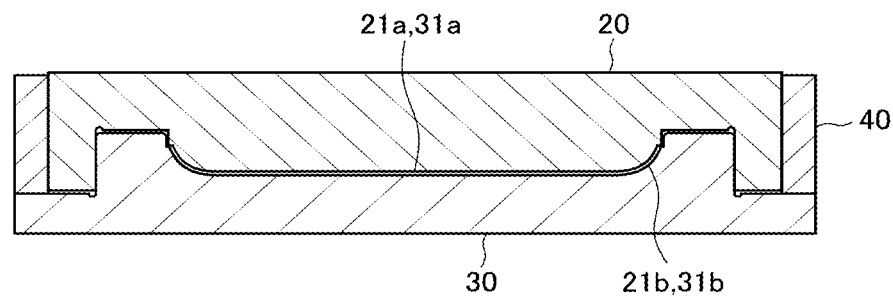
FIG. 6 is a cross-sectional view illustrating the fitted state of the molding die for 3D cover glass illustrated in FIG. 5.

FIG. 4 is a perspective view illustrating a configuration example of the present molding die for 3D cover glass, FIG. 5 is a side view of the present molding die for 3D cover glass illustrated in FIG. 4, and FIG. 6 is a cross-sectional view illustrating the fitted state of the present molding die for 3D cover glass illustrated in FIG. 5.

The present molding die for 3D cover glass illustrated in FIG. 4, FIG. 5 and FIG. 6 includes a convex mold 20, a concave mold 30 and a ring mold 40, and can be used for molding the 3D cover glass 100 illustrated in FIG. 1.

The convex mold 20 has a press surface 21 including a flat press surface A (21a) corresponding to the central part 110 of the 3D cover glass 100 and a press surface B (21b) corresponding to the curved part 120 of the 3D cover glass 100. Here, the curvature radius of the flat press surface A (21a) is more than 100 mm.

The concave mold 30 has a press surface 31 including a flat press surface A (31a) corresponding to the central part 110 of the 3D cover glass 100 and a press surface B (31b) corresponding to the curved part 120 of the 3D cover glass 100. Here, the curvature radius of the flat press surface A (31a) is more than 100 mm.

The present molding die for 3D cover glass includes a pair of molds configured such that, during press-molding, the press surface A (21a) of the convex mold 20 and the press surface A (31a) of the concave mold face each other, and the press surface B (21b) of the convex mold 20 and the press surface B (31b) of the concave mold 30 face each other.

The convex mold 20, as illustrated in FIG. 4, may have a concave portion 22 in the back surface of the press surface 21. As described later specifically, in this case, the distribution of pressure applied to the mold during press-molding can be optimized. This can further suppress, during press-molding, occurrence of wrinkles in such portions correspond to the four corners of the central part providing a flat plane of the 3D cover glass as a final product, and also occurrence of wrinkles in other portions of the central part than the four corners.

Also, the present molding die for 3D cover glass may have a nitrogen inlet and a nitrogen drain for nitrogen inside the mold. In molding a 3D cover glass, fitting between the convex mold 20 and concave mold 30 is generally carried out in the air. In this case, by introducing nitrogen through, for example, as illustrated in FIG. 4, an inlet 32 formed in the concave mold 30 to substitute the inside of the mold with the nitrogen, deterioration of the mold during press-molding is suppressed. However, when nitrogen remains in the inside of the mold, transfer between the press surface of the mold and the glass sheet cannot be achieved, resulting in the lowered molding precision. In view of this, it is preferable that, for example, such a drain 33 is provided in the concave mold 30 as illustrated in FIG. 4 and excess nitrogen remaining inside the mold is released from the drain 33, thereby preventing deterioration of the molding precision. Here, formation of the inlet and drain is not limited to the concave mold 30 but they may also be formed in the convex mold 20.

Also, the present molding die for 3D cover glass may also include the ring mold 40. After the convex mold 20 and concave mold 30 are fitted, the fitted portion may be covered with the ring mold 40. The ring mold 40 can suppress invasion of foreign substances from the fitted portion and thus can suppress a problem such as occurrence of flaw due to the foreign substances, thereby enabling enhancement in the quality of the 3D cover glass as a final product.

The present molding die for 3D cover glass can suppress the occurrence of wrinkles in the 3D cover glass during press-molding, since the closest distance D [mm] between the press surfaces A (21a, 31a) of the convex mold 20 and concave mold 30 and the closest distance D1 [mm] between the press surfaces B (21b, 31b) thereof satisfy the conditions mentioned below during press-molding.

Here, during press-molding, the distance between the press surfaces A and the distance between the press surfaces B change. Thus, the distance when the press surfaces A are closest to each other is defined as the closest distance D [mm], and the distance when the press surfaces B are closest to each other is defined as the closest distance D1 [mm].

Here, when the plate thickness of the 3D cover glass as a final product is represented by t [mm], the present molding die for 3D cover glass preferably satisfy the closest distance D [mm] between the press surfaces A at the time of press-molding being t mm or more and (t+0.02) mm or less. The reason for this is based on the fact that, if the closest distance D [mm] between the press surfaces A is larger than (t+0.02) mm, when a glass sheet is pressed by the press surfaces A, there occurs a portion where a space between the press surfaces A and glass surfaces is large and the pressing pressure in such portion reduces, thereby possibly causing wrinkles in the central part thereof.

The 3D cover glass after press-molded may further be subjected to a chemical strengthening treatment. Here, even when a chemical strengthening treatment is executed on the 3D cover glass after press-molded, the plate thickness t [mm] of the 3D cover glass as a final product refers to the plate thickness of the 3D cover glass before execution of the chemical strengthening treatment. Specifically, the plate thickness t [mm] of the 3D cover glass as a final product is preferably 0.3 mm or more and 2.0 mm or less.

The closest distance D1 [mm] between the press surfaces B is explained with reference to FIG. 7A, FIG. 7B and FIG. 8.

Figure 7A:
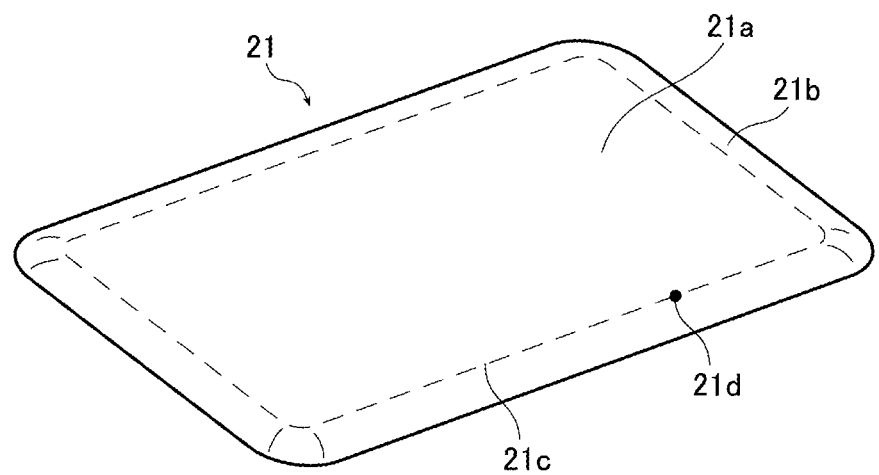
FIG. 7A and FIG. 7B are views for explaining the positional relationships between the respective portions of a press surface of a convex mold. Specifically.
Figure 7B:
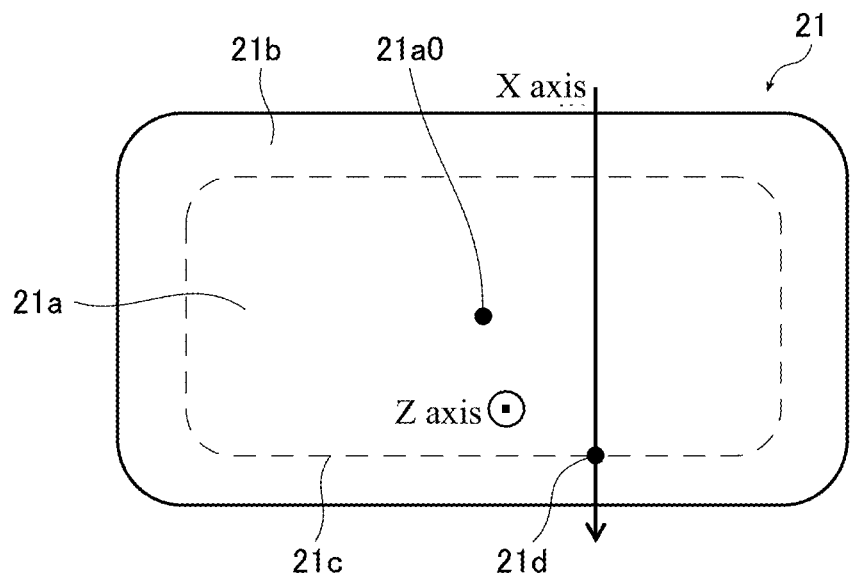

FIG. 7A and FIG. 7B are views for explaining the positional relationships between the respective portions of the press surface of the convex mold. Specifically, FIG. 7A is a perspective view of the press surface of the convex mold, and FIG. 7B is a plan view of the press surface of the convex mold.

The press surface 21 of the convex mold includes the press surface A 21a and the press surface B 21b.

In the press surface the convex mold illustrated in FIG. 7B, a boundary line 21c between the press surface A 21a and press surface B 21b is defined as a first position where the curvature radius thereof becomes 100 mm or less in a direction from a center 21a0 of the flat press surface A 21a toward a periphery. An original point 21d is defined as an arbitrary point on the boundary line 21c, and an X axis direction is defined as a direction of a line extending from the original point 21d in parallel to the press surface A 21a and orthogonally to a tangent of the boundary line 21c. In the X axis, a direction toward the press surface A 21a from the original point 21d is defined as a minus direction, and its opposite direction is defined as a plus direction. Here, the original point 21d is also referred to as "a bending start point" (in the X axis direction) in the present specification. Furthermore, a Z axis is defined as a normal direction of the press surface A 21a. Under this premise, a cross-sectional view in the XZ plane is taken. Here, in FIG. 7A and FIG. 7B, the reason why the above description is made for the press surface of the convex mold is because the boundary between the press surface A and press surface B exists more inside in the convex mold than in the concave mold. Here, in the convex mold 21 having the press surface B 21b over the whole periphery thereof as illustrated in FIG. 7B, the X axis direction indicates a direction parallel to one of the sides of the outer edges of the convex mold 21 as provides a straight line. However, even in the case where the X axis direction is defined as a direction (e.g., in FIG. 7B, diagonal direction) passing a central point of at least one curved part (a rounded curved part in a plan view) of the four corners, the conditions mentioned below are satisfied.

(a) of FIG. 8 is a partial cross-sectional view in the XZ plane of the present molding die for 3D cover glass in the fitted state. In (a) of FIG. 8, the distance between the press surfaces A of the convex mold and concave mold is the closest distance D [mm], and the distance between the press surfaces B of the convex mold and concave mold is the closest distance D1 [mm]. Here, the closest distance, in the present specification, is also referred to as a "clearance" or a "plate thickness clearance".

In the XZ plane, at individual locations of the press surfaces B, the closest distance between the press surfaces B of the convex mold and concave mold during press-molding is defined as D1 [mm]. In this case, the maximum value of the change amount $\Delta D1/\Delta X$ of the closest distance D1 [mm] between the press surfaces B in the plus direction in the X axis direction with reference to a position on the convex mold is set to 0.01 or more. Therefore, occurrence of wrinkles during press-molding can be suppressed. This is explained below with reference to FIG. 9A, FIG. 9B and FIG. 9C.

The present molding die for 3D cover glass illustrated in FIG. 9A includes a pair of a convex mold 20 and a concave mold 30. Here, the shapes of the press surfaces 21a, 21b, 31a, and 31b of the convex mold 20 and concave mold 30 are deformed in order to emphasize the characteristics of the present molding die for 3D cover glass. In FIG. 9A, the press surfaces A (21a, 31a) corresponding to the central part of the 3D cover glass, which provides a flat plane in the 3D cover glass as a final product, are located inside the broken lines; and the press surfaces B (21b, 31b) corresponding to the curved surface of the 3D cover glass, which provides a three-dimension curved surface in the 3D cover glass as a final product, are located outside the broken lines.

The press surfaces A 21a and 31a of the convex mold 20 and concave mold 30 are respectively flat planes. In the press surfaces B (21b, 31b) of the convex mold 20 and concave mold 30, their mutual distance (distance in the Z axis direction) becomes longer toward the outer peripheral parts thereof. Even in the case where the fitting between the pair of molds is misaligned as illustrated by the arrow a in FIG. 9B, the centers of the molds are hard to be displaced and the plate thickness clearance between the press surfaces A of the molds remains uniform. As a result, pressures applied to the central part, which provides a flat plane in the 3D cover glass 100 as a final product, are dispersed uniformly. Therefore, occurrence of wrinkles in such portions corresponding to the four corners of the central part, which provides a flat plane in the 3D cover glass 100, can be suppressed.

Here, in the case where the maximum value of the change amount $\Delta D1/\Delta X$ of the closest distance D1 [mm] between the press surfaces B in the plus direction in the X axis direction with reference to the convex mold is set to 0.01 or more, the occurrence of wrinkles in such portions corresponding to the four corners of the central part, which provides a flat plane in the 3D cover glass, can be suppressed. The occurrence of wrinkles in such portions corresponding to the four corners of the central part providing a flat plane in the 3D cover glass can be effectively suppressed particularly for a final product including a curved part in the whole periphery of the 3D cover glass, and furthermore, the occurrence of wrinkles in other portions than the four corners of the central part can also be suppressed effectively. Here, the maximum value of the change amount $\Delta D1/\Delta X$ of the closest distance D1 [mm] between the press surfaces B in the plus direction in the X axis direction with reference to the convex mold is preferably 0.02 or more and more preferably 0.03 or more.

However, depending on the closest distance D1 [mm] between the press surfaces B, there is a fear that the occurrence of wrinkles in such portions corresponding to the four corners of the central part providing a flat plane in a 3D cover glass may not be suppressed. Therefore, in the present molding die for 3D cover glass, the maximum value of the closest distance D1 [mm] between the press surfaces B is set to be (t+0.10) mm or larger, and preferably (t+0.15) mm or larger. However, in the case where the distance between the press surfaces B becomes large, the shape accuracy of the glass may deteriorate and thus pressing of the glass into a desired shape may be difficult. Therefore, in the present molding die for 3D cover glass, the maximum value of the closest distance D1 [mm] between the press surfaces B is set to be (t+0.50) mm or smaller, and preferably (t+0.30) mm or smaller.

Also, in the present molding die for 3D cover glass, a material having a thermal conductivity of 50 W/(m·K) is preferably used. Specific examples of the material satisfying this condition include carbon, cemented carbide and copper. This is to prevent the deformation of the press surfaces due to the deformation of the mold caused by the temperature distribution. A high thermal conductivity can easily keep a uniform temperature distribution, so that deformation of the press surfaces can be ignored.

It is preferable that the convex mold 20 and concave mold 30 does not have a large difference in volumes therebetween, because a difference in heat capacity therebetween becomes small and a stable molding can be performed with high accuracy. Specifically, when the volumes of the convex mold 20 and concave mold 30 are represented by V1 [mm$^3$] and V2 [mm$^3$], respectively, the ratio thereof V1/V2 is preferably 0.5 or more and 2.0 or less, and more preferably 0.8 or more and 1.2 or less.

In the present molding die for 3D cover glass, in order to optimize the distribution of pressure applied to the mold during press-molding, a concave portion 22 may be formed on the back surface of the press surface 21 of the convex mold 20. FIG. 10 is a plan view illustrating a configuration example of the present molding die for 3D cover glass for molding a 3D cover glass including a curved part over the whole periphery thereof and having a substantially rectangular outer edge in a plan view the corner portions of which are rounded. FIG. 10 illustrates a back surface with respect to the press surface 21 of the convex mold 20 and the concave portion 22 is formed on this back surface. In FIG. 10, the press surface 31 of the concave mold 30 is indicated by a broken line.

In the present molding die for 3D cover glass, the object to optimize the distribution of pressure applied to the mold is to make uniform pressures applied to the central part of a 3D cover glass which provides a flat plane in the 3D cover glass 100 as a final product to thereby suppress occurrence of wrinkles in such portions corresponding to the four corners of the central part providing a flat plane in the 3D cover glass 100, and also to suppress occurrence of wrinkles in other portions of the central part than the four corners. Thus, the concave portions 22 to be formed on the back surfaces of the press surfaces of the convex mold 20 and/or concave mold 30 preferably satisfy the following conditions (1), (2) and (3), with reference to FIG. 10 and FIG. 11 as well.

Here, an X' axis described below is explained with reference to FIG. 11. FIG. 11, similarly to FIG. 7B, is a plan view of the press surface of the convex mold. The X' axis is a straight line which passes through the center 21a0 of the press surface A 21a and whose linear distance $d_x$ [mm] between two intersection points 21e and 21f with the boundary line 21c of the press surface A 21a and press surface B 21b is the smallest.

(1) The concave portion 22 includes the center of the back surface of the press surface A.
(2) The concave portion 22 is formed over the whole of the back surface of the press surface A in the X' axis direction.
(3) When the maximum length of the press surface B having an intersection point with a line segment connecting the two intersection points 21e and 21f on the X' axis direction and orthogonal to this line is represented by L [mm], the minimum length of the concave portion in the direction orthogonal to the X' axis direction is represented by L' [mm] and the maximum length thereof is represented by L" [mm], L, L' and L" satisfy L>L" and a ratio (L'/L) being 0.5 or more and 0.98 or less.

Here, like the concave portion 22 illustrated in FIG. 10, in the case where the lengths of the concave portion 22 in the direction orthogonal to the X' axis direction are all the same, the minimum length L' [mm] and the maximum length L" [mm] of the concave portion is L"[mm] are the same.

With respect to the condition (3), L'/L is preferably 0.7 or more and 0.95 or less and, more preferably 0.8 or more and 0.9 or less.

Also, the concave portions 22 to be formed on the back surfaces of the press surfaces of the convex mold 20 and/or concave mold 30 more preferably satisfy the following condition (4) in addition to the above conditions (1), (2) and (3).

(4) The concave portion includes an end portion in the direction orthogonal to the X' axis direction being a linear shape parallel to the X' axis direction, or being line-symmetrical with respect to the orthogonal direction of the X' axis direction.

Here, the term "end portion", in this case, is not a point but corresponds to a line which is obtained by connecting the intersecting points of the concave portion with a line orthogonal to the X' axis direction when the positions of the line on the X' axis are changed successively.

Also, the depth of the concave portion 22 is preferably 0.1 mm or more and 5 mm or less, and more preferably 0.5 mm or more and 2.0 mm or less. Here, the depth of the concave portion 22 may have a distribution within the above-described range. However, for the reason that the distance between the concave portion 22 and a heater plate used to heat the mold during press-molding is made uniform to thereby make uniform radiant heat applied to the concave portion, the depth of the concave portion 22 is preferably uniform. Furthermore, the concave portion may be formed only in the back surface of the press surface 21 of the convex mold 20, or may be formed only in the back surface of the press surface of the concave mold 30, or may be formed in both of them.

Next, description is given below of a 3D cover glass according to an embodiment of the present invention (which is hereinafter referred to as "the present 3D cover glass"). The present 3D cover glass is similar to the 3D cover glass described above as a target to be molded by the present molding die in that it has a central part formed in a flat plane and includes at least in a portion of the peripheral part thereof a curved part formed in a 3 dimension-curved surface having a curvature radius of 100 mm or less. Also, the present 3D cover glass has a polygonal shape such as triangle, quadrangle, pentagon, hexagon, or octagon, in a plan view. Here, the term "polygonal shape" used here includes also a shape whose corner portion(s) in a plan view is (are) rounded. In other words, even in the case where the outer edge of the present 3D cover glass in a plan view includes a corner containing a curved portion, if the shape obtained by straight lines of the outer edge and virtual straight lines extended from the straight lines has a polygonal shape, this case is regarded as the polygonal shape. Here, in the case of a shape including a curved part over the whole periphery of the polygonal shape, it includes a rounded portion in all corner portions of the polygonal shape in a plan view.

Here, the curvature radius of the curved part of the present 3D cover glass depends on the specifications of image display devices. For example, in the case of a smartphone, in order to enhance the fit, the curvature radius is preferably 50 mm or less, more preferably 20 mm or less, and further more preferably 10 mm or less. Also, for the reason to prevent cracking due to stress concentration at the time of falling, the curvature radius of the curved part is preferably 0.2 mm or more, more preferably 0.5 mm or more, and further more preferably 1.0 mm or more.

The present 3D cover glass includes curved parts at least in the two sides of the peripheral part of the polygonal shape. For example, in the case where the present 3D cover glass is a 3D cover glass which is a rectangle (a quadrangle) in a plan view and includes a curved surface over the whole periphery of the peripheral part of the rectangle, relatively large wrinkles are easy to occur in portions corresponding to the four corners of the central part thereof. In this case, the wrinkles occurring in the four corners of the center part may not be accommodated only in the four corners but spread to other portions than the four corners of the central part 110 in some cases, so that the wrinkles cannot be suppressed in the whole of the central part 110 in some cases. Thus, in order to realize enhancement in the quality with reduced wrinkles in the central part of the present 3D cover glass, it is important to suppress wrinkles occurring in the four corners of the central part.

The 3D cover glass 100 illustrated in FIG. 1 includes the curved part 120 over the whole periphery of the peripheral part thereof. However, in FIG. 1, at least two of the four sides of the peripheral part may have the curved parts. For example, in FIG. 1, only the left and right peripheral parts (sides) may have the curved parts; or, only the upper and lower peripheral parts (sides) may have the curved parts. Also, only the upper and left peripheral parts (sides) may have the curved parts; or, only the upper and right peripheral parts (sides) may have the curved parts; or, only the lower and left peripheral parts (sides) may have the curved parts; or, only the lower and right peripheral parts (sides) may have the curved parts. Also, in FIG. 1, the three peripheral parts (sides) except for the upper peripheral part may have the curved parts; or, the three peripheral parts (sides) except for the lower peripheral part may have the curved parts; or, the three peripheral parts (sides) except for the left peripheral part may have the curved parts; or, the three peripheral parts (sides) except for the right peripheral part may have the curved parts.

As described above, since the wrinkles remarkably occurring in the four corners of the central part cause occurrence of wrinkles in other portions of the central part than the four corners, the quality level of the surface of the present 3D cover glass can be evaluated by the occurrence level of wrinkles in the central part. Specifically, the present 3D cover glass can be evaluated by using retardation as an index. For example, $\Delta n$ represents a refractive index difference (refractive index anisotropy) measured by using a birefringence measuring device between a refractive index for a light of a first linearly polarized light having a predetermined wavelength and a refractive index for a light of a second linearly polarized light orthogonal to the first linearly polarized light; and, t [nm] represents the thickness of the central part of the present 3D cover glass.

Here, retardation ($\Delta n \times t$) [nm] measured may be used to evaluate the level of wrinkles occurring in the central part. Also, retardation is not limited to the case where the thickness (t [nm]) of the central part of an actual 3D cover glass is used as it is, but evaluation may be carried out while retardation is converted to ($\Delta n \times d$) [nm/mm] per 1 mm thickness. In this case, calculation can be made such that d=t [nm]/t [mm]. In the case where wrinkles exist in the central part, residual stress is generated in the wrinkling portion, thereby generating a stress distribution with respect to other portions than the wrinkling portion. This stress distribution is detected as retardation.

For example, the present 3D cover glass having a rectangle shape in a plan view and having a curved part over the whole periphery of the peripheral part thereof can be evaluated by using retardation per 1 mm thickness measured by radiating a light having a wavelength of 543 nm orthogonally to the central part, and the maximum value thereof is preferably 16 nm/mm or less. For example, the light having a wavelength of 543 nm is a light of the center of the visible region and is suitable as an index of evaluation. Here, in the case where the maximum value of the retardation at the central part is 16 nm/mm or less, it can be said that remarkable wrinkles have not occurred also in the portions corresponding to the four corners of the central part. Also, the maximum value of the retardation is more preferably 10 nm/mm or less, and further preferably 6 nm/mm or less.

Also, in the present 3D cover glass, when a boundary line between the central part and curved part is defined as a first position where the curvature radius thereof becomes 100 mm or less in a direction from the center (gravity point) of the central part toward a periphery; an original point is defined as an arbitrary point on the boundary line; and an X axis is defined as a line extending from the original point in parallel to the central part and orthogonally to the boundary line; the length of the curved part in the X axis direction is preferably 0.5 mm or longer and 50 mm or shorter. That is, the flat central part can also be said to correspond to the region whose curvature radius is more than 100 mm.

Here, the above-mentioned X axis is the X axis when a reference numeral 21 in FIG. 7A and FIG. 7B designates a 3D cover glass, 21a designates the central part, 21a0 designates the center (gravity point) of the central part, 21b designates the curved part thereof, 21c designates the boundary line, and 21d designates the original point.

Also, the bending depth of the curved part of the present 3D cover glass is preferably 0.5 mm or more. This is because in the case where the bending depth of the curved part is less than 0.5 mm, the fit of the hand may be impaired. Also, the bending depth of the curved part is preferably 30 mm or less. This is because in the case where the bending depth of the curved part exceeds 30 mm, the thickness of mobile equipment or display device may be increased more than necessary. Here, when the central part is taken as an XY plane and, in the Z axis in the normal direction of the XY plane, "the bending depth" can be defined as a distance to the tip end of bending in the Z axis direction with the XY plane as a reference.

Also, the plate thickness of the present 3D cover glass is preferably 0.3 mm or more in order to keep the strength of the glass above a certain level. In order to enhance a yield in molding, the plate thickness is more preferably 0.4 mm or more. Also, for weight reduction of the material, the plate thickness of the present 3D cover glass is preferably 2.0 mm or less and, for enhancement in the yield in molding, it is more preferably 1.5 mm or less.

Also, the diagonal size of the present 3D cover glass in a plan view, in order to control pressure distribution in molding, is preferably 50 mm or more and 1,000 mm or less.

Furthermore, the present 3D cover glass is preferably chemically strengthened for enhancement in impact strength.

Next, description is given below of a method for manufacturing a 3D cover glass according to one embodiment of the present invention (which is hereinafter referred to as "the present manufacturing method for 3D cover glass"). In the present manufacturing method for 3D cover glass, a flat glass sheet is placed between the convex and concave molds of the present molding die for 3D cover glass, heated, for example, heated to above the transition point of the glass sheet to mold into a 3D cover glass and, then cooled.

Also, from the viewpoint of design or the like, it is sometimes required to manufacture a 3D cover glass whose curved part has a bending angle with the maximum value of 60° or more and 90° or less. The bending angle of the curved part is described with reference to FIG. 12 which is a cross-sectional schematic view of the present 3D cover glass.

In FIG. 12, a bending angle α of the curved part is an angle from the flat plane part of a 3D cover glass to the bending tip end of the curved part except for a vertical portion v. The vertical portion v is a portion of the curved part extending vertically with respect to the flat plane part. Also, a vending depth d is a distance in the vertical direction (in the Z axis direction) from the bending tip end of the curved part to a central point of the flat plane part. The curvature radius R of the curved part is a curvature radius of an approximate curve of the curved part except for the vertical portion v.

In manufacturing a 3D cover glass whose curved part has a bending angle with the maximum value of 60° or more and 90° or less, the following points must further be noted.

As materials for the molding die for 3D cover glass, use can be preferably made of a material which has a low friction coefficient with glass in high temperatures to hardly deteriorate the surface quality of the glass surface, does not contain oxide to hardly cause chemical surface bonding to glass, and further is easy to release. As such material, carbon is preferably used.

However, carbon has a smaller thermal expansion coefficient than the glass material. Therefore, a difference occurs in the dimensional change during press-molding between the molding die (carbon) and glass material. More specifically, it must be noted that differences occur in the expansion amount at the time of heating and in the shrinkage amount at the time of cooling, and the glass material is larger in both of the expansion amount and shrinkage amount.

The difference in the expansion amount at the time of heating does not provide a problem because the glass material is softened under high temperatures. Also, the difference in the shrinkage amount at the time of cooling does not provide a problem in the case where the bending angle of the curved part of the 3D cover glass is smaller than 60°.

However, in the case where the maximum value of the bending angle of the curved part of the 3D cover glass is 60° or more and 90° or less, if the difference in the shrinkage amount at the time of cooling is large, the glass material comes into contact with the convex mold and further shrinks to press against the convex mold, so that the glass material may be cracked.

In order to suppress such cracking of the glass material, the thermal expansion coefficient at 500° C. of the glass sheet is preferably larger than the thermal expansion coefficient at 500° C. of the convex mold, and the difference therebetween is preferably $20 \times 10^{-7}$/K or less, and more preferably, $10 \times 10^{-7}$/K or less. Since the shrinkage amount at the time of cooling of carbon is larger than that of glass, in order to prevent worsening of the shape deviation of the glass at the time of cooling and to prevent cracking of the glass, the difference in the thermal expansion coefficient at 500° C. is preferably $0.1 \times 10^{-7}$/K or more and, more preferably $1.0 \times 10^{-7}$/K or more.

Here, the reason for employing the thermal expansion coefficient at 500° C. is that since the glass material is in an elastic material region, where a rapid change in the thermal expansion coefficient is small, the difference in the thermal expansion coefficient from carbon is easily derived.

In order to make the difference between their mutual thermal expansion coefficients $20 \times 10^{-7}$/K or less, the thermal expansion coefficient of the convex mold at 500° C. is preferably $50 \times 10^{-7}$/K or more and more preferably $60 \times 10^{-7}$/K or more. Although the concave mold may be formed of the same material as the convex mold, a material having a thermal expansion coefficient at 500° C. smaller than that of the convex mold is preferably used. This is because a change amount of the shape of the concave mold due to thermal expansion at high temperatures becomes smaller and thus, a deviation of a shape error amount from the design of a molded product due to variations in molding temperatures can be reduced. In this case, a difference in the thermal expansion coefficient at 500° C. between the convex mold and the concave mold is preferably $20 \times 10^{-7}$/K or more and more preferably $30 \times 10^{-7}$/K or more.

In the case of manufacturing a 3D cover glass whose curved part has a bending angle with the maximum value of 60° or more and 90° or less, when a Y axis is defined as an axis orthogonal to the above-defined X axis and Z axis, the distance between the press surfaces B in the XY plane is preferably different depending on the locations thereof. FIG. 13 is a view in which the X-Y-Z axes are added to FIG. 4.

The convex mold of the present molding die for 3D cover glass includes a convex part whose outer periphery has a polygonal shape when viewed from the above-defined Z axis direction. The concave mold paired with this convex mold includes a concave part whose outer periphery corresponds to the above-mentioned polygon shape when viewed from the Z axis.

FIG. 14 is a cross-sectional view in the XY plane of the present molding die for 3D cover glass in a fitted state. The convex mold 20 in FIG. 14 includes a substantially rectangular convex part whose outer periphery has rounded corner portions. The concave mold 30 in FIG. 14 includes a substantially rectangular concave part whose outer periphery has rounded corner portions.

In FIG. 14, $G_s$ represents the closest distance in the linear portions of the substantially rectangular shapes between the press surfaces B of the convex mold 20 and concave mold 30 during press-molding, and $G_c$ represents the closest distance in the corner portions of the substantially rectangular shapes. Of the substantially rectangular shape illustrated in FIG. 14, a portion whose curvature radius is more than 100 mm is defined as a linear portion, while a portion whose curvature radius is 100 mm or less is defined as a corner portion.

In the case of manufacturing a 3D cover glass whose curved part has a bending angle with the maximum value of 60° or more and 90° or less, the present molding die preferably includes a portion with the closest distance $G_c$ in the corner portion of the substantially rectangular shape larger than the closest distance $G_s$ in the linear portion. Also, more preferably, the closest distances $G_c$ at all positions in the corner portions of the substantially rectangular shape are larger than the closest distances $G_s$ at all positions in the linear portion of the substantially rectangular shape. In the case where the closest distance $G_s$ in the linear portion of the substantially rectangular shape is equal to the closest distance $G_c$ in the corner portion of the substantially rectangular shape, or the case where the closest distance $G_s$ in the linear portion of the substantially rectangular shape is larger than the closest distance $G_c$ in the corner portion, when molding the 3D cover glass, the glass of the corner portion of the substantially rectangular shape is easy to be sandwiched between the convex mold 20 and concave mold 30 and thus a difference may occur in the shrinkage amount at the time of cooling. When a difference occurs in the shrinkage amount at the time of cooling, the height of the molded 3D cover glass may be uneven.

In the case where the present molding die includes the portion with the closest distance $G_c$ in the corner portion of the substantially rectangular shape larger than the closest distance $G_s$ in the linear portion, the glass of the corner portion of the substantially rectangular shape can be prevented from being sandwiched between the convex mold 20 and concave mold 30, thereby preventing the height of the molded 3D cover glass from becoming uneven.

When the closest distance $G_s$ in the linear portion of the substantially rectangular shape is represented by g [mm], the closest distance $G_c$ in the corner portion of the substantially rectangular shape preferably includes a portion of 1.1 g mm or more, more preferably includes a portion of 1.5 g mm or more, and further more preferably includes a portion of 2 g mm or more. Also, the closest distances $G_c$ at all positions in the corner portions of the substantially rectangular shape are preferably 1.1 g mm or more, more preferably 1.5 g mm or more, and further more preferably 2 g mm or more.

However, in the case where the closest distance $G_c$ in the corner portion of the substantially rectangular shape is excessively larger than the closest distance $G_s$ in the linear portion, the height of the molded 3D cover glass may be uneven. Therefore, the closest distance $G_c$ in the corner portion of the substantially rectangular shape preferably includes a portion 4 g mm or less and, more preferably, the closest distances $G_c$ at all positions in the corner portions of the substantially rectangular shape are 4 g mm or less.

In the case of manufacturing a 3D cover glass whose curved part has a bending angle with the maximum value of 60° or more and 90° or less, the convex mold preferably includes a portion configured such that, in the cross-sectional view in the XZ plane, the shape of the press surface B inclines toward the press surface A in the X axis direction as the distance from the press surface A in the Z direction.

FIG. 15A and FIG. 15B are partial cross-sectional views illustrating configuration examples of a convex mold according to the embodiment of the present invention. In the convex mold 20 illustrated in FIG. 15A, the shape of the press surface B21b extends vertically along the Z axis direction and, the shape in the X axis direction does not change as the distance from the press surface A21a. Meanwhile, in the convex mold 20 illustrated in FIG. 15B, the shape of the press surface B21b inclines toward the press surface A21a (toward the center of the press surface A21a) in the X axis direction as the distance from the press surface A21a in the Z direction. In the case of manufacturing a 3D cover glass whose curved part has a bending angle with the maximum value of 60° or more and 90° or less, preferred is the convex mold 20 illustrated in FIG. 15B. In the convex mold 20 illustrated in FIG. 15B, when $l_z$ represents the distance that the press surface B21b separates from the press surface A21a in the Z axis direction, and $l_x$ represents the distance that the press surface B21b moves toward the press surface A21a in the X direction, $l_x$ is preferably $0.01 l_z$ or more.

EXAMPLES

The present invention is described below more in detail with reference to the following Examples. However, the present invention is not limited to these Examples.

Examples 1 to 3, Comparative Example 1

In Examples 1 to 3 and Comparative Example 1, a 3D cover glass was press molded by using a molding die including a pair of a convex and concave molds.

The outer dimensions of the molding die (convex and concave molds) used are approximately 180 mm×120 mm×30 mm. The volumes of the convex and concave molds were set to be the same, while the concave mold was used as a lower mold and the convex mold was used as an upper mold. The molding was carried out by using, as a glass (sheet) material, a glass material DT-STAR (plate thickness t=0.5 mm, transition temperature Tg=547° C., and strain point Ts=501° C.) manufactured by Asahi Glass Co., Ltd. First, the glass material was heated to a temperature where the viscosity coefficient of the glass becomes $10^{9.5}$ Pa·s and was molded such that the maximum value of a press pressure became 0.55 MPa. After then, the glass was cooled down to the strain point Ts [° C.] in the state where the glass was pressed such that the maximum value of the press pressure was 0.5 MPa and then, allowed to cool down to the normal temperature.

Here, the molded 3D cover glass had a substantially rectangular shape with a size of approximately 150 mm×80 mm in a plan view; the minimum curvature radius R of a 3-dimensional curved surface was approximately 5 mm over the whole periphery; the molded 3D cover glass had a curved part whose length in the above-defined X axis direction was 6.8 mm; and the bending depth of the curved part was 4.5 mm.

(b) of FIG. 8 shows the difference between the closest distance D [mm] of the press surfaces A and the plate thickness of the 3D cover glass as a final product, and the difference between the closest distance D1 [mm] of the press surfaces B and the plate thickness of the 3D cover glass as a final product, for Examples 1 to 3 and Comparative Example 1. In Examples 1 to 3 and Comparative Example 1, the surface shape (the plate thickness clearances of the convex mold) of the press surface B of the convex mold is changed and, as shown in (b) of FIG. 8, the difference between the closest distance D1 [mm] between the press surfaces B and the plate thickness of the 3D cover glasses as a final product is different from each other. Here, the maximum values of ΔD1/ΔX in Examples 1 to 3 and Comparative Example 1 are shown in Table 1. In Table 1, the maximum values of D and D1 of the press surface A respectively are values which include the plate thickness t=0.5 mm.

Retardation in the central part of the 3D cover glass after molded was measured by using a birefringence measuring device (WPA-100, manufactured by Photonic Lattice Co., Ltd.). Light having a wavelength of 543 nm was irradiated orthogonally onto the central part of the 3D cover glass existing inside the boundary line between the press surface A and press surface B to measure retardation per 1 mm thickness. The maximum values of the retardation per 1 mm thickness are shown in the following Table 1.

TABLE 1

|  | Comparative Example 1 | Example 1 | Example 2 | Example 3 |
|---|---|---|---|---|
| D of press surface A [mm] | 0.532 | 0.515 | 0.512 | 0.513 |
| Maximum value of ΔD1/ΔX | 0.009 | 0.054 | 0.053 | 0.058 |
| Maximum value of D1 [mm] | 0.58 | 0.69 | 0.70 | 0.62 |
| Retardation maximum value [nm/mm] | 18.14 | 5.36 | 6.66 | 5.52 |

In Examples 1 to 3 in which the maximum value of the change amount ΔD1/ΔX of the closest distance D1 [mm] between the press surfaces B in the plus direction of the X axis is 0.01 or more in a region from the bending start point of the press surface B of the convex mold to the outer peripheral part of the press surface B, the maximum values of the retardation per 1 mm thickness in the central part of the 3D cover glass were respectively 16 nm/mm or less. Meanwhile, in Comparative Example 1 in which the maximum value of ΔD1/ΔX is less than 0.01, the maximum values of the retardation per 1 mm thickness was more than 16 nm/mm.

Example 4

In this Example, by using a molding die including a pair of a convex and concave molds, a 3D cover glass whose curved part has a bending angle α with the maximum of 90° was press-molded.

The outer dimensions of the molding die (convex and concave molds) used are approximately 40 mm×40 mm×120 mm. The volumes of the convex and concave molds were set to be the same, while the concave mold was used as a lower mold and the convex mold was used as an upper mold. The molding was carried out by using, as a glass (sheet) material, a glass material DT-STAR (plate thickness t=0.55 mm, transition temperature Tg=547° C.), and strain point Ts=501° C.) manufactured by Asahi Glass Co., Ltd. First, the glass material was heated to a temperature where the viscosity coefficient of the glass becomes $10^{9.5}$ Pa·s and was molded such that the maximum value of a press pressure became 0.55 MPa. After then, the glass was cooled down to the strain point Ts [° C.] in the state where the glass was pressed such that the maximum value of the press pressure was 0.5 MPa and then, allowed to cool down to the normal temperature.

Here, the molded 3D cover glass had a substantially rectangular shape with a size of approximately 30 mm×25 mm in a plan view; the minimum curvature radius R of a 3-dimensional curved surface was approximately 5 mm over the whole periphery; the molded 3D cover glass had a curved part whose length in the above-defined X axis direction was 2.0 mm; and the bending depth of the curved part was 4.5 mm.

(a) of FIG. 16 is a partial cross-sectional view in the XZ plane of the molding die for 3D cover glass in the fitted state. In (a) of FIG. 16, the distance between the press surfaces A of the convex and concave molds is the closest distance D [mm], while the distance between the press surfaces B of the convex and concave molds is the closest distance D1 [mm]. (b) of FIG. 16 is a view showing the difference between the closest distance D [mm] of the press surfaces A and the plate thickness of the 3D cover glass as a final product, and the difference between the closest distance D1 [mm] of the press surfaces B and the plate thickness of the 3D cover glass as a final product, for Example 4.

Here, in this Example, the thermal expansion coefficient of the glass material at 500° C. was $72\times10^{-7}$/K, the thermal expansion coefficient of the convex mold was set to be $70\times10^{-7}$/K, and thus the difference between them was $2\times10^{-7}$/K. In this case, the thermal expansion coefficient of the concave mold at 500° C. was set to be $35\times10^{-7}$/K. Also, in this Example, when the convex and concave molds were fitted with each other, in the XY plane as illustrated in FIG. 14, the closest distance $G_s$ in the linear portions in the substantially rectangular shape was set constant to 0.1 mm, and the closest distance $G_c$ in the corner portions of the substantially rectangular shape was designed such that 0.2 mm was the maximum distance. That is, $G_c$ was set to be about twice $G_s$.

Furthermore, in this Example, the convex mold used was a convex mold configured such that, as illustrated in FIG. 15B, the shape of the press surface B21b is inclined toward the center of the press surface A21a in the X axis direction as the distance from the press surface A21a in the Z direction. Specifically, the convex mold used had a shape configured such that the distance $l_z$ that the press surface B21b separates from the press surface A21a in the Z direction is 4.0 mm, and the distance $l_x$ that the press surface B21b moves toward the press surface A21a in the X axis direction is 0.1 mm. That is, in this Example, $l_x$ was set to be about 0.025 times $l_z$.

The closest distance D between the press surfaces A, the maximum value of the closest distance D1 between the press surfaces B, the maximum value of the change amount $\Delta D1/\Delta X$ of the closest distance D1 [mm] between the press surfaces B in the plus direction of the X axis in a region ranging from the bending start point of the press surface B of the convex mold to the outer peripheral part of the present press surface B, and retardation per 1 mm thickness measured in the central part of the 3D cover glass which exists inside the boundary line between the press surface A and press surface B were as shown in the following Table 2.

TABLE 2

|  | Example 4 |
| --- | --- |
| D of press surface A [mm] | 0.565 |
| Maximum value of $\Delta D1/\Delta X$ | 0.325 |
| Maximum value of D1 [mm] | 0.655 |
| Retardation maximum value [nm/mm] | 4.36 |

The present invention has been described in detail with reference to specific embodiments thereof, but it will be apparent to one skilled in the art that various modifications and changes can be made without departing the scope and spirit of the present invention.

The present application is based on Japanese Patent Application No. 2017-171117 filed on Sep. 6, 2017 and Japanese Patent Application No. 2018-112703 filed on Jun. 13, 2018, the contents of which are incorporated herein by reference.

DESIGNATION OF REFERENCE NUMERALS AND SIGNS

20: Convex mold
21: Press surface
21a: Press surface A
21a0: Center of press surface A
21b: Press surface B
21c: Boundary line
21d: Original point
21e, 21f: Intersection point of X' axis with boundary line
22: Concave portion
30: Concave mold
31: Press surface
31a: Press surface A
31b: Press surface B
32: Nitrogen inlet
33: Drain of nitrogen inside mold
40: Ring mold
100: 3D cover glass
110: Central part
120: Curved part
200: Convex mold
300: Concave mold

What is claimed is:

1. A molding die for 3D cover glass comprising: a flat central part; a peripheral part; and a curved part located at least in a portion of the peripheral part and defining a 3-dimensional curved surface having a curvature radius of 100 mm or less,
wherein the molding die comprises a pair of a convex mold and a concave mold each having a flat press surface A corresponding to the central part and a press surface B corresponding to the curved part,
wherein the closest distance D [mm] between the press surfaces A of the convex mold and the concave mold during press-molding is t mm or larger and (t+0.02) mm or smaller wherein t [mm] represents a plate thickness of a 3D cover glass as a final product; and
wherein in the convex mold, when a boundary line between the press surface A and the press surface B is defined as a first position where the curvature radius becomes 100 mm or less in a direction from the center of the press surface A toward a periphery; an original point is defined as an arbitrary point on the boundary line; an X axis is defined as a line extending from the original point in parallel to the press surface A and orthogonally to the boundary line; in the X axis, a direction toward the press surface A from the original point is defined as a minus direction and the opposite direction thereof is defined as a plus direction; a Z axis is defined as the normal line direction at the center of the press surface A; and in a cross-sectional view in the XZ plane, the closest distance between the press surfaces B of the convex mold and the concave mold during press-molding at individual locations of the press surface B is represented by D1 [mm], the maximum value of the change amount $\Delta D1/\Delta X$ of D1 in the plus direction of the X axis with the convex mold as a reference is 0.01 or more and the maximum value of D1 is (t+0.10) mm or larger and (t+0.50) mm or smaller.

2. The molding die for 3D cover glass according to claim 1,
wherein the convex mold and the concave mold each composed of a material having a thermal conductivity of 50 W/(m·K) or more, and
the convex mold and the concave mold have volumes of V1 [mm³] and V2 [mm³], respectively, and satisfy a ratio V1/V2 being 0.5 or more and 2.0 or less.

3. The molding die for 3D cover glass according to claim 1,
wherein at least one of the convex mold and the concave mold comprises, in the back surface of the press surface A, a concave portion satisfying the following conditions (1), (2) and (3):
(1) the concave portion includes the center of the back surface of the press surface A;
(2) when viewed from the Z axis direction, a X' axis direction is defined as the direction of a straight line which passes through the center of the back surface of the press surface A and whose linear distance $d_x$ [mm] between two intersection points with the boundary line is smallest, the concave portion is formed over the whole of the back surface of the press surface A in the X' axis direction; and
(3) when viewed from the Z axis direction, when the maximum length of the press surface B in a direction having an intersection point with a line segment connecting the two intersection points on the X' axis and orthogonal thereto is represented by L [mm], the minimum length and the maximum length of the concave portion in a direction orthogonal to the X' axis direction are represented by L' [mm] and L" [mm], respectively, L, L' and L" satisfy L>L" and a ratio (L'/L) being 0.5 or more and 0.98 or less.

4. The molding die for 3D cover glass according to claim 3,
wherein the concave portion further satisfies the following condition (4):
(4) the concave portion comprises an end portion in a direction orthogonal to the X' axis direction being a linear shape parallel to the X' axis direction or being line-symmetrical with respect to the orthogonal direction of the X' axis direction.

5. The molding die for 3D cover glass according to claim 3,
wherein the concave portion has a depth of 0.1 mm or more and 5 mm or less.

6. The molding die for 3D cover glass according to claim 5,
wherein the depth of the concave portion is uniform.

7. The molding die for 3D cover glass according to claim 1, further comprising a ring mold covering a fitted portion between the convex mold and the concave mold.

8. The molding die for 3D cover glass according to claim 1,
wherein the convex mold provides a thermal expansion coefficient at 500° C. being $50 \times 10^{-7}$/K or more.

9. The molding die for 3D cover glass according to claim 1,
wherein the convex mold comprises a convex part with an outer periphery having a polygonal shape when viewed from the Z axis direction, and the concave mold comprises a concave part with an outer periphery corresponding to the polygonal shape when viewed from the Z axis direction,
the polygonal shape comprises a corner part having a rounded part and connecting together two linear parts when viewed from the Z axis direction, and
when a Y axis is defined as an axis orthogonal to the X axis and the Z axis, in a cross-sectional view in the XY plane, the closest distance between the press surfaces B of the convex mold and the concave mold during press-molding is defined in each of the individual locations of the press surface B, and at least a portion of the corner part of the polygonal shape has the closest distance $G_c$ longer than the closest distance $G_s$ in the linear portion of the polygonal shape.

10. The molding die for 3D cover glass according to claim 1,
wherein the convex mold comprises a portion configured such that, in the cross-sectional view in the XZ plane, the shape of the press surface B inclines toward the press surface A in the X axis direction as the distance from the press surface A in the Z axis direction.

11. A method for manufacturing a 3D cover glass, comprising
placing a flat glass sheet between the convex mold and the concave mold of the molding die for 3D cover glass as described in claim 1,
heating the glass sheet to mold into a 3D cover glass, and cooling the 3D cover glass.

12. The method for manufacturing a 3D cover glass according to claim 11,
wherein the glass sheet has a thermal expansion coefficient at 500° C. being larger than that of the convex mold, and the difference therebetween is $20 \times 10^{-7}$/K or less.

13. The method for manufacturing a 3D cover glass according to claim 11,
wherein the 3D cover glass after cooled has the maximum value of a bending angle of 60° or larger and 90° or smaller.

* * * * *